United States Patent [19]

Diaz et al.

[11] Patent Number: 5,744,546
[45] Date of Patent: Apr. 28, 1998

[54] MELT-PROCESSED BLENDS CONTAINING POLY(VINYL ALCOHOL)

[75] Inventors: Thierry Christian Claude Diaz, Roquefort Les Pins; Jean-Philippe Gaetan Meyer, Grasse Le Plan, both of France; Carlos Alfonso Cruz, Holland, Pa.

[73] Assignee: Rohm and Haas Company, Philadelphia, Pa.

[21] Appl. No.: 798,417

[22] Filed: Feb. 7, 1997

[51] Int. Cl.$^6$ .................................................. C08F 16/06
[52] U.S. Cl. ........................................ 525/57; 525/60
[58] Field of Search ................................ 525/57, 60

[56] References Cited

U.S. PATENT DOCUMENTS

| | | |
|---|---|---|
| 3,833,686 | 9/1974 | Grochowski et al. . |
| 4,086,296 | 4/1978 | Carty et al. . |
| 4,657,970 | 4/1987 | Shiraki et al. ................ 525/57 |
| 5,147,930 | 9/1992 | LaFleur et al. . |
| 5,189,097 | 2/1993 | LaFleur et al. . |
| 5,208,083 | 5/1993 | Freed . |
| 5,296,537 | 3/1994 | LaFleur et al. . |
| 5,322,892 | 6/1994 | LaFleur et al. . |
| 5,362,801 | 11/1994 | Amici et al. . |
| 5,362,802 | 11/1994 | Amici et al. . |
| 5,362,803 | 11/1994 | LaFleur et al. . |
| 5,378,758 | 1/1995 | Amici et al. . |
| 5,378,759 | 1/1995 | Amici et al. . |
| 5,389,724 | 2/1995 | LaFleur et al. . |
| 5,545,689 | 8/1996 | Amici et al. . |

FOREIGN PATENT DOCUMENTS 0 477 765 A   4/1992   European Pat. Off. .

OTHER PUBLICATIONS

Patent Abstracts of Japan, vol. 005, No. 028 (C–044), 20 Feb. 1981 and JP 55 155042 A (Mitsubishi Chem Ind Ltd), 3 Dec. 1980 abstract and DATABASE WPI, Derwent Publications Ltd., London, GB; AN 81–08788d abstract.
Patent Abstracts of Japan, vol. 009, No. 211 (C–300), 29 Aug. 1985 & JP 60 077976 A (Denki Kagaku Kogyo KK), 2 May 1985 abstract and CHEMICAL ABSTRACTS, vol. 103, No. 24, 16 Dec. 1985, Columbus, Ohio, US, abstract No. 197046 abstract.

*Primary Examiner*—Melvyn I. Marquis
*Assistant Examiner*—D. Aylward
*Attorney, Agent, or Firm*—Ronald S. Hermenau; Darryl P. Frickey

[57] ABSTRACT

Polymers containing a high percentage of vinyl alcohol units are difficult to process into sheet, film, injection-molded objects, or fibers. Such melt-processing is greatly enhanced by admixing certain hydrogenated block copolymers formed by sequential anionic polymerization of butadiene and styrene, followed by hydrogenation, then followed by grafting of maleic anhydride.

1 Claim, No Drawings

MELT-PROCESSED BLENDS CONTAINING POLY(VINYL ALCOHOL)

This invention relates to melt-processed blends of polymers containing a high percentage of vinyl alcohol units blended with certain functionalized hydrogenated block copolymers of polystyrene and polydienes. It further relates to melt-processed blends of these polymers in the form of sheet, film, injection-molded objects, fibers and other formed objects.

Of all the synthetic polymers considered as materials with useful gas permeation properties, such as resistance to passage of oxygen, carbon dioxide, water, and the like, poly(vinyl alcohol) (PVOH), a polymer made up of units of the structure

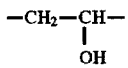

and generally prepared by the total hydrolysis of homopolymers of vinyl acetate or related vinyl esters, the starting polymer made up of units of the structure

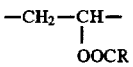

where R is alkyl, that is, from one to eight carbon atoms, preferably methyl, ranks as the most impervious to the passage of small molecules. PVOH exhibits this property because of the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded.

In recent U.S. Pat. Nos. 5,189,097, 5,378,758, and 5,451,635, Amici, La Fleur, and co-workers have described the unexpected effect of relatively low levels of functionalized additives, including mono-olefin and diolefin polymers containing acid functionality, on the melt-processing of poly(vinyl alcohol). These patents do not specifically teach block copolymers or graft copolymers, except to disclose two non-operative graft copolymers, viz., grafts of acrylic acid onto polypropylene and grafts of a styrene/unsaturated acid copolymer onto polyolefins.

Japanese Patent Application (Kokai) 55-155042 teaches that copolymers of ethylene/butene with acid functionality can be used to modify ethylene-vinyl alcohol copolymers. There is no discussion of block copolymers, either with or without polystyrene blocks, as components of a melt-processable poly(vinyl alcohol) blend.

Thus there still exists a need for a means to allow melt-processing of polymers of high vinyl alcohol content, such as fully hydrolyzed or highly hydrolyzed polymers of vinyl esters, into useful objects maintaining most of the barrier properties of the polymer of high vinyl alcohol content, and further to enhance their ability to form films and coatings with improved properties of the film or coating without much loss in barrier properties. We have discovered a novel and unexpected means for melt processing of poly(vinyl alcohol) by melt-blending the poly(vinyl alcohol) with certain functionalized hydrogenated block copolymers of polystyrene and polydienes (polymeric blocks formed from conjugated diolefins). The discovery offers an alternate means for achieving a toughened melt-processed blend based on poly(vinyl alcohol), as the block copolymers chosen are useful as impact modifiers in other plastics. The results are unexpected because of the previous disclosure of the inoperability of grafts of acrylic acid onto polypropylene and grafts of a styrene/ unsaturated acid copolymer onto polyolefins.

Thus, we have discovered a melt-processed blend comprising:

(a) from 80 to 98 parts, based on 100 parts of the blend, of at least one first polymer containing at least 80 mol % of units of the structure

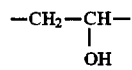

and;

(b) from 2 to 20 parts, based on 100 parts of the blend, of a block copolymer prepared by anionic polymerization of a mixture comprising from 20 to 35 weight percent of styrene and 65 to 80 percent butadiene or isoprene, the block copolymer having been hydrogenated, the block copolymer further containing from 1 to 5 weight percent grafted maleic anhydride.

Preferably the first polymer contains at least 88 mol % units of the "vinyl alcohol" structure, and more preferably the first polymer contains at least 95 mol % units of the "vinyl alcohol" structure, i.e.,

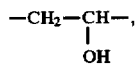

and most preferably contains 98% or more of such units. The optional units in the vinyl alcohol copolymers are preferably those derived from ethylene or vinyl acetate. It is separately preferred that the viscosity of a 4% aqueous solution of the first polymer is at least 4 mPa s, for the melt-processed blend to have attractive thermoplastic properties.

The first polymer preferably should exhibit a low content of acetate ions, such as sodium acetate. The sodium content (or general salt content) may be measured with a Varian AA 300 Atomic Absorption Spectrometer or a similar device. The content may be low as received from the supplier, or it may be decreased by washing the first polymer, or the acetate content may be lowered by treatment with phosphoric acid, as in U.S. Pat. No. 3,425,979, which converts the acetate to acetic acid, which is vented during the melt processing. A value below 0.88% is preferred.

If addition of a low level (less than 10 parts by weight based on 100 parts of the blend, of plasticizer, such as glycerine, is desired, pre-compounding of the powders by such means as Henschel mixing or a Banbury mixer, is desirable to obtain complete mixing. Although glycerine may lower the glass temperature of the final blend, it can aid in obtaining better admixture of the two components, so as to avoid presence of gel or requirement of extensive melt-mixing. It is preferred not to use plasticizer.

Blending of the two polymers may be carried out most conveniently by dry mixing the finely granulated polymer particles prior to melt compounding in a single- or twin-screw extruder. For smaller-scale evaluation, a mill roll may be utilized for the blending, as fusion behavior and any degradation may be readily observed. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents (such as a polyethylene wax), coloring agents, fillers and other compounds. Further, fugitive plasticizers, such as water in amounts about 3%, may be added to aid in compounding and processing the blend.

The blends of the present invention may be considered as a polymer containing vinyl alcohol units modified with a processing aid, since the functionalized block copolymer additive enables the poly(vinyl alcohol) to be melt-processed with a reduced tendency towards thermal decomposition, and aids in the formation of melt-processable objects or melt-processable intermediates, such as pellets.

All of the above melt-processed blends are useful in many applications. When the vinyl alcohol polymer is water-soluble, a film from the blends can be broken down in water for ready disposal. Such blends in film form may also be useful as containers for toxic, corrosive, or skin-sensitizing chemicals which are to be used in water, such as agricultural chemicals to be sprayed. The blends in film form such as in blown film, are useful as high gas barrier films for packaging, especially of food. The films from the blends can be laminated onto substrates to form useful barrier structures for containment or packaging of food or beverages. The blends in container form, such as film, bottles, and the like may be used to exclude gases such as oxygen or to contain gases such as carbon dioxide. Blends with improved heat distortion properties may be useful in hot fill packaging or in retortable or sterilizable container packaging. The blends or laminates may also be useful in museum and other glazing where clarity and long-term retention of an inert atmosphere are desired. The blends may also be useful in bags for medical laundry, and for lamination of films to paper. The blends of the present invention may be used to form useful fibers. The blends may be processed from the melt or from a solvent-swollen gel. The melt-processable blends may be passed through an appropriate die to form filaments which may be stranded into single or multi-stranded fibers of various thicknesses. The fibers may then be further processed into appropriate products, such as packaging materials, water-soluble disposable cloths, such as diapers, and the like. The fibers may be post-treated after forming by chemicals which will insolubilize the poly(vinyl alcohol), and the resulting fibers may be processed into articles with high moisture uptake which do not dissolve in water. Further, the polymers may be spun by a solid state process wherein the fiber is oriented in the solid state to produce a fiber with a very high tensile modulus.

Films from the present blends may be laminated, co-extruded, or co-injection molded to form laminated structures with a good combination of clarity, toughness, and barrier properties. For example, a blend may be co-extruded with poly(ethylene terephthalate) (PET), with poly(methyl methacrylate), with poly(vinyl chloride), or with polycarbonate, to form continuous laminated film with good adhesion between the layers. The co-extruded film with PET can be thermoformed into useful objects without delamination. Multi-layer laminates may also be formed.

The blends may also be injection-molded into useful objects. It should be noted that at additive levels below 6 parts, any external lubricant, such as polyethylene wax, should be avoided or used at lower levels than those shown for mill-mixed or calendered formulations, so that adequate fusion will be obtained in the extruder compounding prior to injection molding.

The blends are also suitable for calendering, profile extrusion, foam extrusion, and extrusion blow molding into useful articles, either in film or as thicker articles.

EXAMPLES

The following poly (vinyl alcohol) is used in the study. Viscosity measurements are by DIN 1342 using a capillary viscometer DIN 52562 and DIN 53012.

| Trade Name | Designation | Supplier | % PVOH | Visc., 4% mPa s | MP, °C. |
|---|---|---|---|---|---|
| Mowiol | 010-98 | Hoechst | 98 | 7.7 | 226 |

The following additives are used in the study:

Additive A: A triblock hydrogenated anionic polymer of butadiene and styrene of 28% styrene content, onto which has been grafted 2% maleic anhydride.

Additive B: A triblock hydrogenated anionic polymer of butadiene and styrene of 32% styrene content, with no grafting of maleic anhydride.

Additive C: A core/shell (70//30) polymer of a butadiene/styrene 95/5 rubber (with 1% divinylbenzene)//methyl methacrylate/butyl acrylate/methacrylic acid (60/30/10); stabilized with a combination of hindered phenol antioxidants as taught in U.S. Pat. No. 5,164,434. This additive is not within the present invention. It is taught in U.S. Pat. No. 5,451,635, and in allowed U.S. application Ser. No. 08/232, 892.

Wax D: polyethylene wax

Test Procedures: The formulations are milled on a two-roll mill to observe fusion, dispersion, color and sticking. After removal of the processed sheet, samples are compression molded to compare color and degree of fusion. Direct milling of dry blends of PVOH and the additives was employed. Conditions were: 100 grams PVOH, 2.0 grams additive, 0.5 grams Wax F: milled 2 minutes with front roller at 235° C., rear roller 225° C. Front roller speed 26 rpm; roller clearance 0.2 mm.; friction (ratio of front mill/rear mill speed) 1.3. Some materials satisfactory at roller clearance 0.2 mm. were further checked for ease of processing with a wider gap (0.5 mm.) Samples of the removed film (if fusion occurred) were compression molded at 250 kPa/cm$^2$ at 235° C., then 2 minutes with no heat.

Examples 1–3

This Example demonstrates the ability of the maleic anhydride-grafted triblock copolymer to melt-process PVOH versus the poor behavior of a similar block copolymer without maleic anhydride and the excellent behavior of Additive D, previously shown to cause melt fusion. Example 4 is a control with no additives supplied to the PVOH.

|  | Formulation | | | |
| --- | --- | --- | --- | --- |
|  | Ex. 1<br>Additive A | Ex. 2<br>Additive B | Ex. 3<br>Additive C | Ex. 4<br>PVOH Control |
| Fusion | GOOD | POOR | GOOD | POOR |
| Color | GOOD | POOR | GOOD | DARK |
| Homogeneity | EXCELLENT | POOR | EXCELLENT | POOR |
| Over-All Rating | VERY GOOD | POOR | VERY GOOD | POOR |

We claim:

1. A melt-processed blend comprising:

a) from 80 to 98 parts, based on 100 parts of the blend, of at least one first polymer containing at least 80 mol % of units of the structure

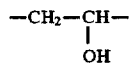

and (b) from 2 to 20 parts, based on 100 parts of the blend, of a block copolymer prepared by anionic polymerization of a mixture comprising from 20 to 35 weight percent of styrene and 65 to 80 percent butadiene or isoprene, the block copolymer having been hydrogenated, the block copolymer further containing from 1 to 5 weight percent grafted maleic anhydride.

* * * * *